(12) United States Patent
Sood et al.

(10) Patent No.: US 7,882,255 B2
(45) Date of Patent: Feb. 1, 2011

(54) METHOD AND APPARATUS FOR MAINTAINING LOCAL AREA NETWORK ("LAN") AND WIRELESS LAN ("WLAN") SECURITY ASSOCIATIONS

(75) Inventors: Kapil Sood, Beaverton, OR (US); Jesse R. Walker, Portland, OR (US); Karanvir S. Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 987 days.

(21) Appl. No.: 11/393,018

(22) Filed: Mar. 29, 2006

(65) Prior Publication Data

US 2007/0239875 A1 Oct. 11, 2007

(51) Int. Cl.
*G06F 15/16* (2006.01)
*G06F 7/04* (2006.01)
*H04W 4/00* (2009.01)
*H04L 29/06* (2006.01)
*H04L 9/32* (2006.01)
*H04M 1/66* (2006.01)

(52) U.S. Cl. ............... 709/230; 709/250; 370/338; 713/150; 713/168; 455/411; 726/2

(58) Field of Classification Search ................ 709/230, 709/249, 250; 370/338; 713/150, 168; 455/410, 455/411; 726/2
See application file for complete search history.

(56) References Cited

U.S. PATENT DOCUMENTS

| 6,851,068 | B2 * | 2/2005 | Jochiong et al. | 713/330 |
| 7,107,481 | B2 * | 9/2006 | Baba | 714/4 |
| 2003/0237018 | A1 * | 12/2003 | Baba | 714/4 |
| 2004/0013099 | A1 * | 1/2004 | O'Neill | 370/338 |
| 2004/0068666 | A1 * | 4/2004 | Tosey | 713/201 |
| 2004/0090943 | A1 * | 5/2004 | da Costa et al. | 370/338 |
| 2004/0139313 | A1 * | 7/2004 | Buer et al. | 713/150 |
| 2004/0214576 | A1 * | 10/2004 | Myers et al. | 455/445 |
| 2005/0254418 | A1 * | 11/2005 | Rombeaut et al. | 370/219 |
| 2006/0120355 | A1 * | 6/2006 | Zreiq et al. | 370/352 |
| 2006/0193300 | A1 * | 8/2006 | Rawat et al. | 370/338 |

* cited by examiner

*Primary Examiner*—Ranodhi N Serrao
(74) *Attorney, Agent, or Firm*—Blakely, Sokoloff, Taylor & Zafman LLP

(57) ABSTRACT

Cooperating entities share a signaling interface. Each entity establishes a security association between itself and an endpoint, and one of the entities transmits keepalive messages over a channel associated with the security association. Chipsets and systems to implement related methods are also described and claimed.

4 Claims, 5 Drawing Sheets

METHOD AND APPARATUS FOR MAINTAINING LOCAL AREA NETWORK ("LAN") AND WIRELESS LAN ("WLAN") SECURITY ASSOCIATIONS

FIELD

The invention relates to local area network ("LAN") operations and security procedures. More specifically, the invention relates to maintaining security associations in LAN and wireless LAN ("WLAN") environments.

BACKGROUND

Contemporary work environments often include facilities to permit mobile and other transient computing systems to access network resources. These systems present a number of challenges to a network administrator: how to restrict access to authorized users, how to manage machines that may be only intermittently connected, and so forth. Mobile systems themselves present another set of challenges: since they are often battery-powered, techniques to reduce power consumption are important to extend the systems' useful time before a recharge is required.

Sometimes network administration techniques conflict with power management procedures. For example, a network may be configured to disconnect clients that have not used the network for a certain period of time. (This may reduce network resource consumption by mobile or transient systems that have moved out of the area.) On the other hand, many mobile systems can enter a low-power "sleep" mode to conserve power, but while asleep, they may be disconnected from the network. When awakened, the mobile system may be required to perform a time- and power-consuming authentication process to re-establish its network connections. Methods to reconcile network operational procedures with power conservation states may be of value in this field.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
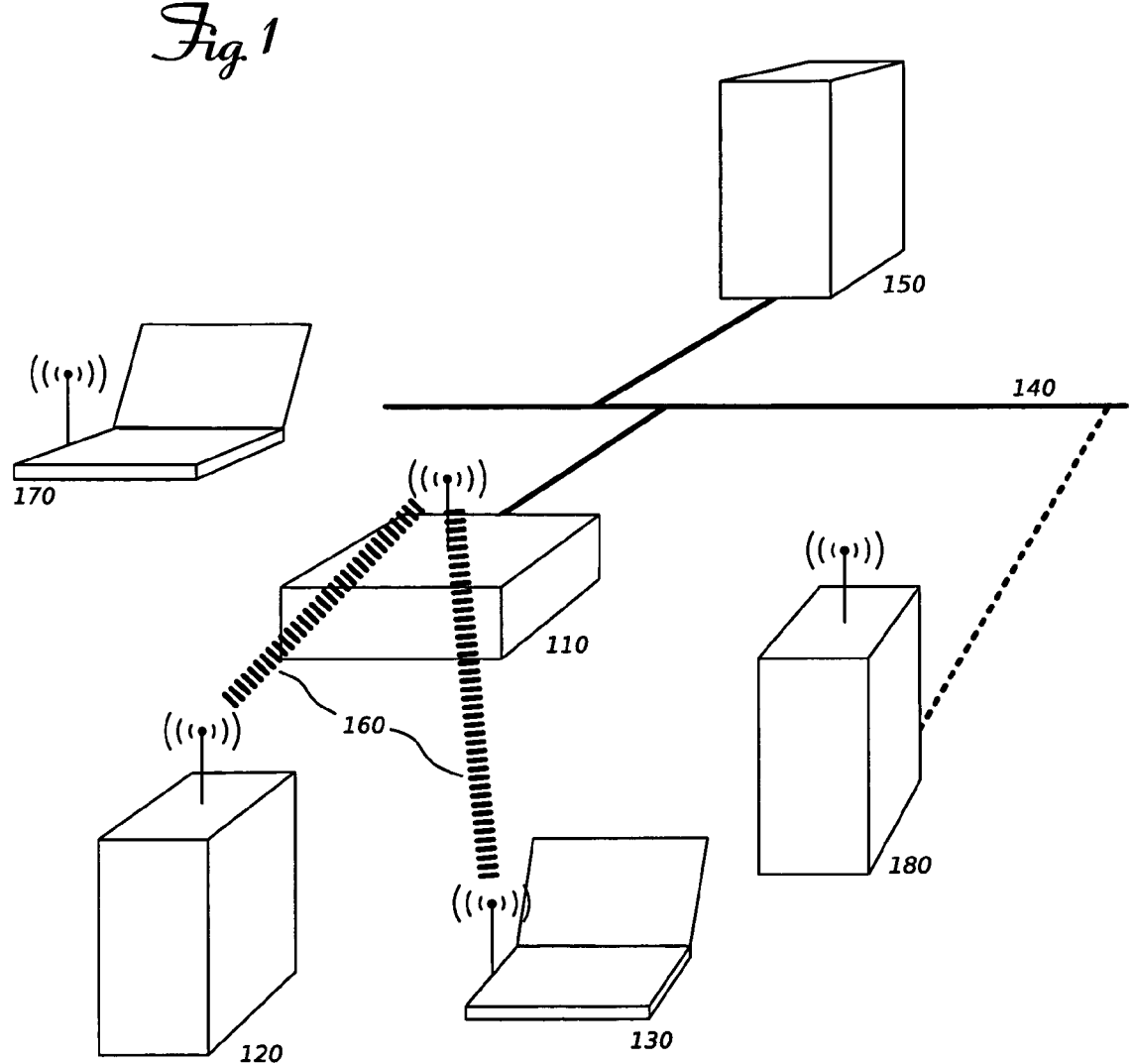
FIG. 1 shows an environment applying embodiments of the invention.

FIG. 1 shows an environment that can make use of embodiments of the invention. A number of data processing systems are shown: laptop computers 130 and 170 are equipped with wireless network interfaces to communicate with access point ("AP") 110. Ordinary (non-portable) system 120 may also communicate through a wireless interface, while system 180 may be equipped with both wireless and wired communication interfaces. Wireless systems may communicate with a wired-only system such as server 150 by transmitting and receiving messages via AP 110, which acts as a gateway between the wireless and wired LANs. Although the wired LAN 140 is shown as a horizontal line (as is typical in network maps), the LAN may actually exist within a single physical switch or within a group of connected switches, to which each wired LAN client system is connected.

Wireless LANs may be configured to require the establishment of a security association between a client and the access point before the client is permitted to send or receive data over the rest of the network. A security association may include shared encryption keys to protect data and management traffic traveling over a radio signal, and establishing the security association may involve presentation and verification of cryptographic certificates or other security credentials. In FIG. 1, heavy dashed lines 160 indicate that system 120 and laptop 130 have established security associations with AP 110, while laptop 170 and system 180 have not yet done so.

One well-known mechanism for establishing security associations is described in the Institute of Electrical and Electronics Engineers ("IEEE") standard number 802.1X, "Port-Based Network Access Control" (current revision published December 2004). Other mechanisms can also be used to perform security-related tasks such as permitting a client system and an access point to verify each other's identity, agreeing on encryption keys and algorithms, and so on. These tasks frequently involve complex mathematical calculations (e.g. multiplication and exponentiation of very large numbers) and may be slow to perform or may consume a significant amount of power. Embodiments of the invention may preserve existing security associations to avoid wasting time and/or power to establish new associations.

Note that security associations may also be established over wired LANs. This application is less common, but mechanisms such as that described in IEEE 802.1X are carrier-independent: the protocols may be performed over any sort of data communication facility. Consequently, embodiments of the invention may be useful in both wired and wireless network environments. Many different types of wired and wireless networks are in use. Common IEEE wired-network standards include 802.3 (commonly known as "Ethernet"), 802.4 ("Token Bus") and 802.5 ("Token Ring"); while wireless standards include 802.11 ("WiFi") and 802.16 (Wireless Metropolitan Area Networks or "WiMAX"). Cellular networks can also benefit from operations according to an embodiment.

Figure 2:
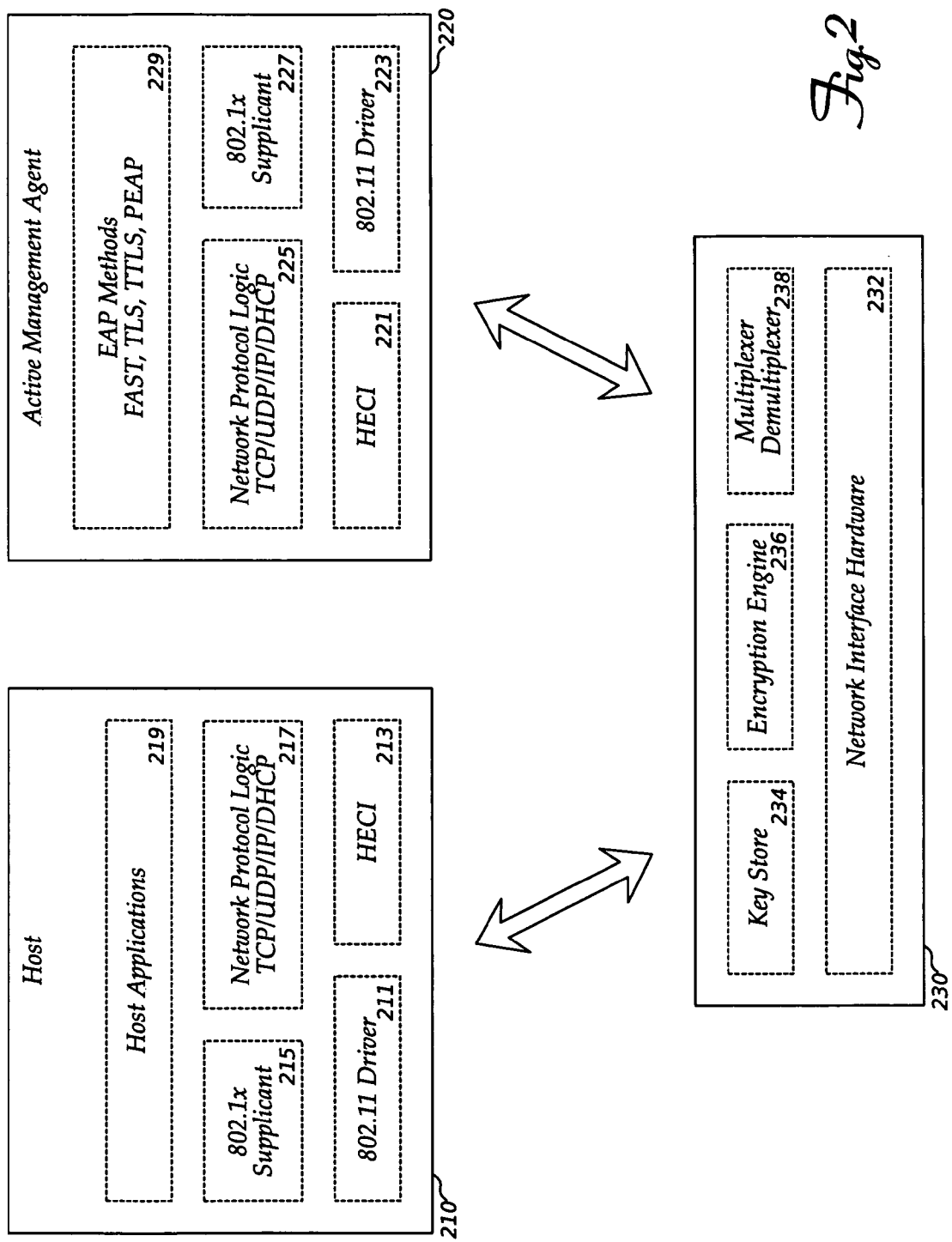
FIG. 2 is a block diagram showing logical components of an embodiment.

FIG. 2 shows one way logical functions of an embodiment of the invention may be partitioned. Elements 210 and 220 are separate entities within a computing system that share a communication interface 230 so that each entity can exchange data with an endpoint (not shown). Host entity 210 includes various components and functions commonly found in a computing system. For example, 802.11 driver 211 provides command and control functions for a communication interface that complies with the IEEE 802.11 wireless network standard. (The IEEE 802.11 standard was originally released in 1997; the current version of the standard is 802.11-REVma-D4.0. Differences between these versions are not important to embodiments of the invention.) Other low-level components may build on the raw wireless connectivity offered by 802.11 driver 211: 802.1X supplicant 215 may perform authentication and security-related tasks so that host 210 can obtain access to a wireless network, and network protocol logic 217 may bundle unreliable, packet-oriented communication services available from driver 211 and interface 230 into reliable, stream- or packet-oriented services according to protocols such as the Internet Protocol ("IP"), User Datagram Protocol ("UDP") or Transmission Control Protocol ("TCP"). Other services that might be provided by network protocol logic 217 include Dynamic Host Configuration Protocol ("DHCP") to obtain network configuration information for host 210. Driver 211, supplicant 215 and protocol logic 217 may form parts of a host operating system ("OS", not shown), which provides network and other services to host applications 219.

A computer system implementing an embodiment of the invention contains a second entity, shown here as Active Management Agent 220, containing functional blocks similar to those in host entity 210. However, instead of host applications 219, agent 220 may use the network communication services provided by driver 223, supplicant 227 and network protocol logic 225 to perform network authentication tasks such as those described in Internet Engineering Task Force ("IETF") Request for Comments ("RFC") number 3748, published June 2004, entitled *Extensible Authentication Protocol ("EAP")*.

Host Embedded Controller Interface ("HECI") logic 213 and 221 provides a generic protocol and interface for communication between the first and second entity. The entities 210 and 220 can use the HECI interface and protocol to schedule their shared use of the underlying communication interface 230, to avoid conflicting operations, and to exchange information about the interface and their use of it. For example, host 210 may use HECI logic 213 and 221 to notify active management agent 220 of the keys or other security information host 210 has obtained by establishing a security association over the interface.

Both entities (host 210 and active management agent 220) share a single underlying communication interface 230. The interface may include the interface hardware 232 itself, as well as memory and logic circuitry such as key store 234, encryption engine 236, and multiplexer/demultiplexer 238. The interface may support communication over only one type of network (e.g. 802.3 Ethernet or 802.11 WiFi) or over several different networks (e.g. a mixed-radio device that supports 802.11, 802.16, 802.21 and/or cellular communications).

An essential difference between the two entities shown in FIG. 2 is in their activity or power profiles. Each entity can operate independently of the other; in fact, in some embodiments, one entity may be active while the other is turned off. Thus, an embodiment of the invention is different from, for example, two host applications that execute concurrently under the control of an operating system. In that case, when the system executing the host applications and operating system is turned off, both applications must stop.

Figure 3:
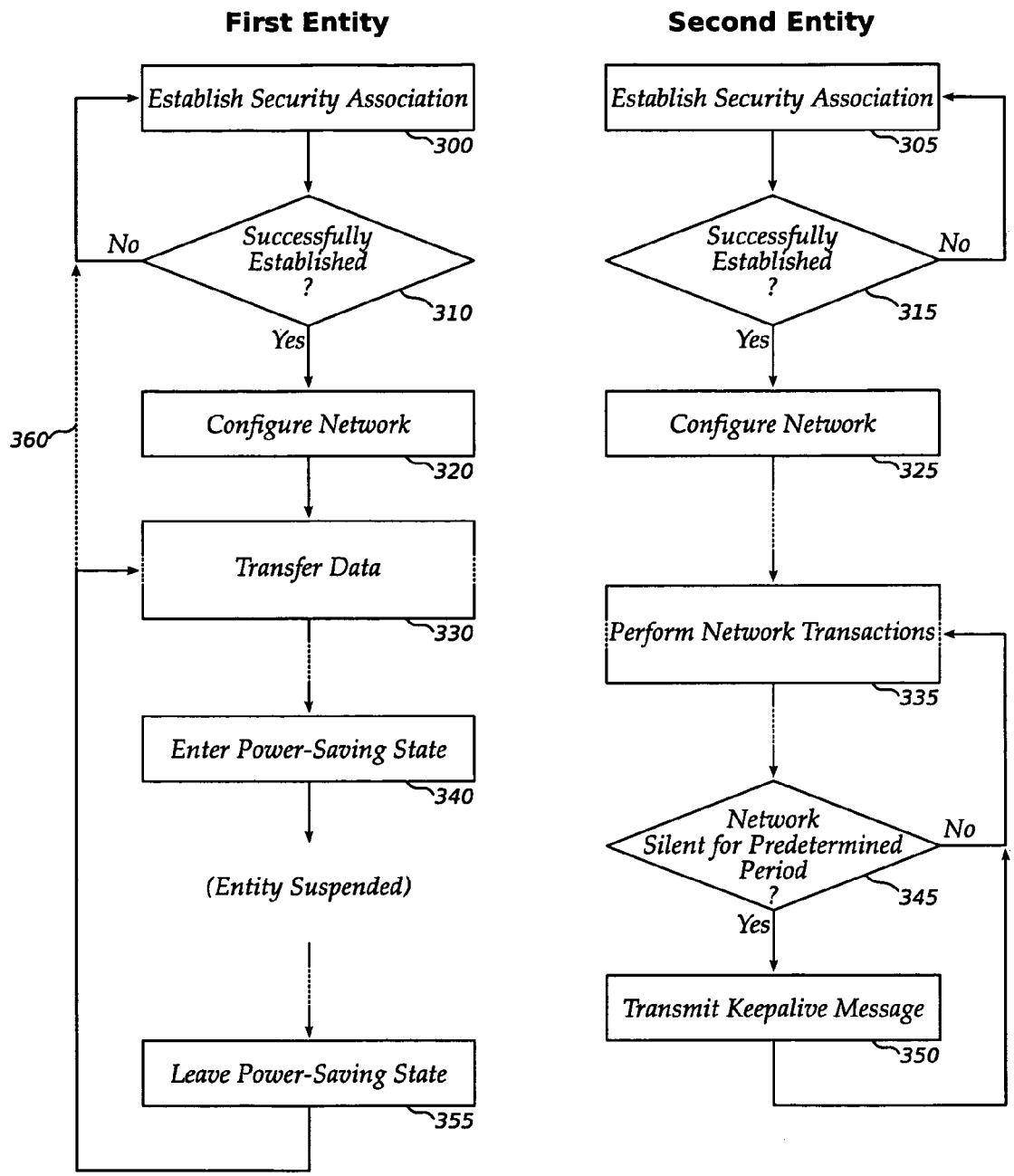
FIG. 3 is a flow chart showing operations of two cooperating entities.

FIG. 3 is a flow chart of operations that may be undertaken by an embodiment of the invention. As shown in FIG. 2, two entities share a single signaling interface such as a network interface. Each entity may establish a security association (300, 305) by engaging in a protocol such as an Extensible Authentication Protocol ("EAP") between the network interface and a communication endpoint. For example, in a wireless environment, each entity may, through its 802.11 driver and 802.1X supplicant, obtain credentials and security information to allow the entity to communicate directly with a wireless access point ("AP"), and through the AP, communicate indirectly with other devices accessible via the network. If either entity is unable to establish a security association (310, 315), it may try again or may simply indicate an error condition to the user. In some embodiments, only one security association need be established. The credentials or other information may be shared with the other entity through a communication interface, or simply by storing them where the other entity can locate and examine them. Thus, "establishing a security association" for one of the entities may be providing the entity the information already established by the other entity.

Once an entity establishes a security association, it may obtain configuration information through a protocol such as DHCP and configure the network with that information (320, 325). With a valid security association and network configuration, each entity can transfer data (330) and/or perform network transactions (335) as required to fulfill its intended functions.

Later, one of the entities may enter a power-saving state (340). This may occur under user control, for example when the user turns the system off or places it in a standby or hibernate mode; or automatically, when the system has been idle for a predetermined period of time. Power-saving states are most common in the context of mobile, battery-powered computing systems such as laptop computers, but even fixed, mains-powered systems (systems that receive their power from a wall socket or generator rather than a battery) may be placed in a power-saving state.

The other entity may continue to perform network transactions (335), even while the first entity is suspended. Continued operation of the second entity may be justifiable from a power-consumption standpoint because its activity may be sporadic and require little power to maintain, and/or because suspending the operation of the second entity may lead to a greater expenditure of power to recover later. Alternatively, functions provided by the second entity may be useful or essential to the overall operation of the system. For example, the second entity may permit a remote administrator working from a network operations center (NOC) to re-start the system and bring the first entity out of its suspended state.

While the first entity is suspended, the second entity may perform very little network activity. In some environments, the endpoint with which the system communicates directly (for example, access point 110 shown in FIG. 1) may disconnect, drop, dissociate, or deauthenticate with peers that are idle for a predetermined period of time. To avoid such dissociation, the second entity may monitor its own network traffic and the network traffic originating between the first entity and the endpoint, and, if the network is silent for a predetermined period of time (345), may transmit a keepalive message (350) to its associated endpoint, or to the associated endpoint of the first entity.

Later, the first entity may leave the power saving state (355) and resume its prior operations, including transferring data over the network (330). In some embodiments, the first entity's security association may have become stale or invalid while the entity was suspended. In that case, the first entity may be required to re-establish a security association (360). In another embodiment, the second entity may discover that the first entity's security association has expired, and may initiate a new security association dialog on behalf of the first entity, prior to waking up the first entity from its power saving state.

The second entity may have access to the security association keys of the first entity. These security keys, which are used for encryption and integrity protection of messages between the first entity and its endpoint, may be resident in the first entity memory from where the second entity can read it. In another embodiment, the keys may be delivered from the first entity to the second entity. In another embodiment, the keys may be stored into the signaling interface by the first entity, and the second entity can use the keys for protecting traffic using this signaling interface.

Regarding the keepalive message that may be transmitted according to an embodiment of the invention, any appropriate message may serve. Messages that are redundant or cause no network state change beyond the maintenance of the entity's security association may be preferred. For example, the second entity may transmit an Address Resolution Protocol ("ARP") response even though it had received no ARP query for its protocol address. Such a gratuitous ARP ("GARP") response might be ignored by any recipients, but would alert an access point that the security association was still in use. In other embodiments, the second entity may transmit messages using other idempotent protocols to alert an access point that the security association is still in use.

In some embodiments, the second entity may have information to report to a peer over the network. For example, the current platform state, posture information (software versions, patch levels, etc.), platform location, environmental conditions, or other information may be provided to a network administration center. In such embodiments, an information-bearing packet may serve to keep the security association alive, as well as to report useful data. Such an embodiment may simply adjust the reporting frequency so that messages will be transmitted often enough to avoid the invalidation of a security association.

In some embodiments, the first and second entity may share a signaling interface and a single security association established between the signaling interface and a direct communication peer. This arrangement may enable the second entity to preserve the security association both for its own benefit and for the benefit of the first entity. After being suspended for a period of time, the first entity may not be required to re-establish a security association because the second entity has maintained the common security association with keepalive messages. The second entity can obtain information about the security association through the HECI as mentioned above, through another transport, or by inspecting registers and memory of the signaling interface (for example, key store 234 as shown in FIG. 2).

Figure 4:
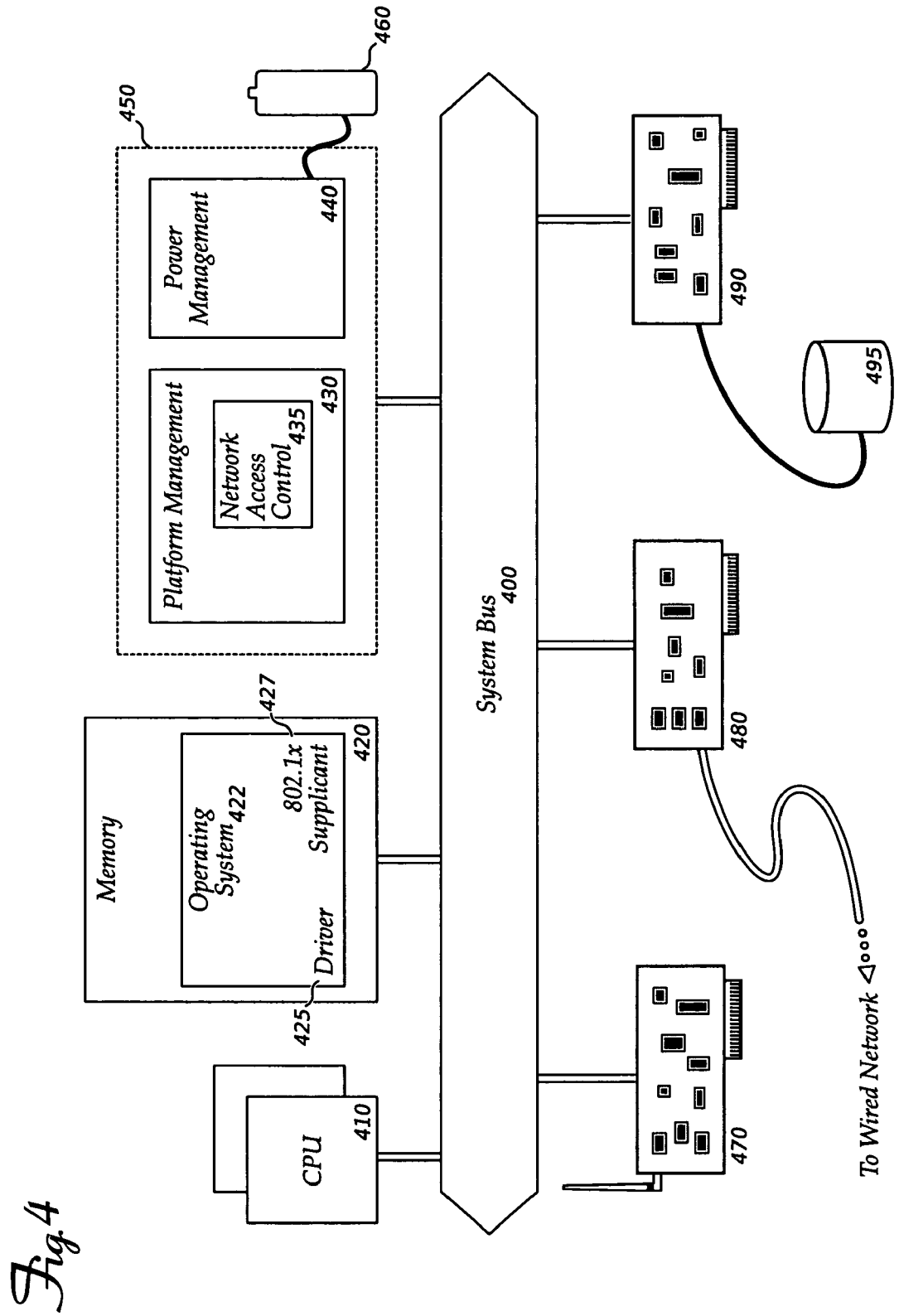
FIG. 4 shows some components of a system that implements an embodiment of the invention.

FIG. 4 is a block diagram showing structures and subsystems of a computer system that includes an embodiment of the invention. The system may include one or more central processing units ("processors" or "CPUs") 410 to execute instructions in memory 420. Those instructions may form operating system 422, including driver 425 and 802.1X supplicant 427. Driver 425 and 802.1X supplicant 427 may operate as mentioned earlier: controlling a signaling interface such as wireless local area network ("WLAN") interface 470 or wired local area network ("LAN") interface 480 to establish a security association with an endpoint, then communicating over the interface with other network entities. Operating system 422 and applications running on it (not shown) may be grouped together as a first network-using entity, as discussed above.

The system also includes a second network-using entity: platform management logic 430, which includes a network access control component 435 to establish a security association over a signaling interface. This Network Access Control component 435 may contain secure memory that is readable only by the second entity, that may be used to store security authentication credentials of the platform (i.e. credentials for the first and second entity) which are used in establishing security associations. Platform management logic 430 may transmit keepalive messages over the interface as discussed in relation to FIG. 3. Timer logic (not shown) may be useful to ensure that keepalive messages are transmitted timely, and gating logic (also not shown) can prevent platform management logic 430 from transmitting keepalive messages when the first entity is not in a low power mode and/or other traffic has refreshed the security association (and therefore keepalive messages are unnecessary).

Power management subsystem 440 may monitor and report on the state of the system's power supply (shown here as battery 460). It may also adjust the power utilization of various parts of the system by, for example, turning off CPUs 410 or hard disk 495 (connected to the system through storage controller 490) when the system is placed in a stand-by or hibernate state.

The system components shown in FIG. 4 are connected to a system bus 400, which carries commands and data between the other components. It is understood that each component will have bus control logic to permit it to send and receive such commands and data over system bus 400, although those logic elements are not shown in this figure.

Various portions of the system may be microelectronic circuits integrated together into a single monolithic package (as indicated by dashed line 450 surrounding platform management logic 430 and power management subsystem 440), or may be separate packages that interact through control and data interfaces. A package or packages of circuits that perform a group of functions may be referred to as a chipset.

Although the network and storage interfaces shown in FIG. 4 are pictured as add-in or plug-in cards, their functions may be integrated into the system or even into a chipset containing logic such as platform management logic 430 or power management 440. Embodiments of the invention can maintain security associations over both wired and wireless networks.

It is appreciated that hardware, firmware and software to perform operations according to an embodiment of the invention may be distributed differently than shown in FIG. 4. For example, the two CPUs shown at element 410 may be multiple execution cores of a single physical processor, and may share some support circuitry (e.g. a cache, bus interface unit, or memory management unit). Platform management logic 430 may be implemented as software or firmware running on one core from among the multiple cores of a platform. Similarly, memory 420 may be ordinary volatile random access memory ("RAM"), or any of various types of non-volatile memory such as electrically-erasable, programmable read only memory ("EEPROM"), Flash memory, etc.

Some CPUs provide facilities that can be used by appropriate software to create multiple "virtual" machines. Virtual machine monitor ("VMM") software can create many execution environments, each of which appears to be an independent physical system to software running there. However, the virtual environments really share the underlying hardware with each other and with the VMM. Platform management logic 430 may be implemented by software running in a virtual machine; the VMM may permit virtual machines to be turned off or placed in a low-power state independently of each other.

Other CPUs may provide a special instruction execution mode that is independent of the normal execution mode. Hardware interlock features may protect the modes so that even fully-privileged instruction sequences in one mode cannot access or alter memory and/or resources available to the other mode. One example of such a special instruction execution mode is the System Management Mode ("SMM") provided by some microprocessors manufactured by Intel Corporation of Santa Clara, Calif. Platform management logic according to an embodiment of the invention may be implemented in SMM.

As mentioned several times, embodiments of the invention may be useful in a mobile devices such as a laptop computer, a cell phone, a personal digital assistant, or other similar device with on-board processing capability and a wireless communication interface that is powered by a direct current (DC) power source that supplies DC power to the mobile device and that is solely within the mobile device and needs to be recharged on a periodic basis, such as a fuel cell or a battery.

Figure 5:
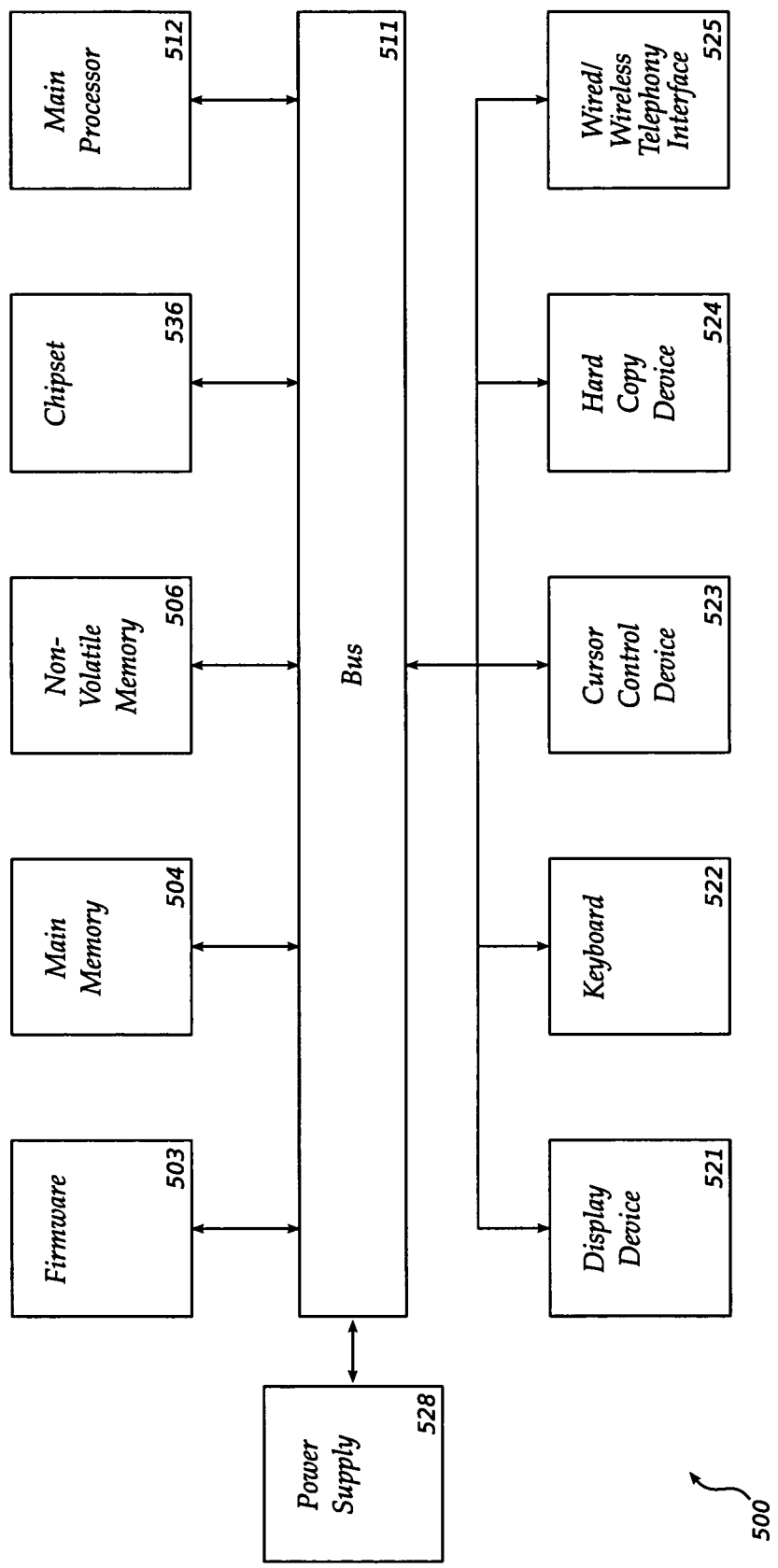
FIG. 5 is another block diagram of a system according to an embodiment of the invention.

FIG. 5 is a block diagram of an example computer system that may use an embodiment of the invention. In one embodiment, computer system 500 comprises a communication mechanism or bus 511 for communicating information, and an integrated circuit component such as a main processing unit 512 coupled with bus 511 for processing information. One or more of the components or devices in the computer system 500 such as the main processing unit 512 or a chip set 536 may implement an embodiment of the platform management logic described above. The main processing unit 512 may include one or more processor cores working together as a unit.

Computer system 500 further comprises a random access memory ("RAM") or other dynamic storage device 504 (referred to as main memory) coupled to bus 511 for storing information and instructions to be executed by main processing unit 512. Main memory 504 also may be used for storing temporary variables or other intermediate information during execution of instructions by main processing unit 512.

Firmware 503 may be a combination of software and hardware, such as Electronically Programmable Read-Only Memory (EPROM) that has the operations for the routine recorded on the EPROM. The firmware 503 may embed foundation code, basic input/output system code (BIOS), or other similar code. The firmware 503 may make it possible for the computer system 500 to boot itself.

Computer system 500 also comprises a read-only memory (ROM) and/or other static storage device 506 coupled to bus 511 for storing static information and instructions for main processing unit 512. The static storage device 506 may store OS level and application level software.

Computer system 500 may further be coupled to or have an integral display device 521, such as a cathode ray tube ("CRT") or liquid crystal display ("LCD"), coupled to bus 511 for displaying information to a computer user. A chipset may interface with the display device 521. Hard copy device 524 may be provided to produce semi-permanent records (e.g. printouts) of information processed by the system.

An alphanumeric input device (keyboard) 522, including alphanumeric and other keys, may also be coupled to bus 511 for communicating information and command selections to main processing unit 512. An additional user input device is cursor control device 523, such as a mouse, trackball, trackpad, stylus, or cursor direction keys, coupled to bus 511 for communicating direction information and command selections to main processing unit 512, and for controlling cursor movement on a display device 521. A chipset may interface with the input output devices.

Another device that may be coupled to bus 511 is a power supply 528 such as a battery and alternating current ("AC") adapter circuit. Furthermore, a sound recording and playback device, such as a speaker and/or microphone (not shown) may optionally be coupled to bus 511 for audio interfacing with computer system 500. Another device that may be coupled to bus 511 is a wireless communication module 525. The wireless communication module 525 may employ a Wireless Application Protocol ("WAP") to establish a wireless communication channel. The wireless communication module 525 may implement a wireless networking standard such as the IEEE 802.11 standard (IEEE standard 802.11-1999, published by IEEE in 1999.)

In one embodiment, the software used to perform methods according to an embodiment of the invention can be embedded onto a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g. read only memory including firmware; random access memory; magnetic disk storage media; optical storage media; flash memory devices; etc.) Instructions to cause a processor to operate as described above may also be stored as a pattern of logic gates in a programmable logic device that is incorporated into the system.

The applications of the present invention have been described largely by reference to specific examples and in terms of particular allocations of functionality to certain hardware and/or software components. However, it should be recognized that WLAN and LAN security associations can also be maintained by software and hardware that distribute the functions of embodiments of this invention differently than herein described. Such variations and implementations are understood to be captured according to the following claims.

We claim:

1. A mobile device, comprising:
a host entity on the mobile device having a first host embedded controller interface and a first power control profile, the host entity comprising at least a wireless network driver to provide command and control functions that comply with at least IEEE 802.11 communications standards, a supplicant that performs authentication functions, and network protocol logic that bundles unreliable, packet data into reliable stream or packet data;
an active management agent entity on the mobile device having a second host embedded controller interface and a second power control profile, wherein the first power control profile and the second power control profile are independent of each other such that one of the host entity and active management agent entity may be turned off while the other remains active, the active management agent entity comprising at least functional blocks that provide network authentication in an Extensible Authentication Protocol (EAP)-compliant manner;
a network interface device on the mobile device shared by the host entity and the active management agent entity;
access control logic on the mobile device to perform a network access protocol transaction and generate a security association for the mobile device, wherein the security association is shared between the host entity and the active management agent entity via the first and second host embedded controller interfaces; and
keepalive logic on the mobile device to transmit a keepalive message from the active management agent entity over the network interface device while the host entity is in a low-power state.

2. The mobile device of claim 1, wherein the network interface device is a wired or wireless local area network device.

3. The mobile device of claim 1, wherein the network protocol transaction is an 802.1x transaction.

4. The mobile device of claim 1, wherein the keepalive message is a gratuitous address resolution protocol ("GARP") message or other idempotent protocol message.

* * * * *